United States Patent
Suzuki et al.

(10) Patent No.: US 10,760,613 B2
(45) Date of Patent: Sep. 1, 2020

(54) ROTARY DEVICE

(71) Applicant: JTEKT CORPORATION, Osaka-shi, Osaka (JP)

(72) Inventors: Akiyuki Suzuki, Nagoya (JP); Ryo Shiina, Kashiwara (JP)

(73) Assignee: JTEKT CORPORATION, Osaka (JP)

(*) Notice: Subject to any disclaimer, the term of this patent is extended or adjusted under 35 U.S.C. 154(b) by 229 days.

(21) Appl. No.: 16/027,814

(22) Filed: Jul. 5, 2018

(65) Prior Publication Data

US 2019/0017542 A1 Jan. 17, 2019

(30) Foreign Application Priority Data

Jul. 11, 2017 (JP) ................. 2017-135378

(51) Int. Cl.
*F16C 19/36* (2006.01)
*F16C 33/66* (2006.01)

(52) U.S. Cl.
CPC .......... *F16C 19/364* (2013.01); *F16C 33/664* (2013.01); *F16C 33/6659* (2013.01); *F16C 33/6681* (2013.01)

(58) Field of Classification Search
CPC ............... F16C 19/364; F16C 33/6655; F16C 33/6659; F16C 33/6681
USPC .......................... 384/462, 473, 560, 571–572
See application file for complete search history.

(56) References Cited

U.S. PATENT DOCUMENTS

| 1,631,217 | A | * | 6/1927 | Matthews | B60R 17/00 184/13.1 |
| 2,017,260 | A | * | 10/1935 | Smith | E21B 3/04 184/6.18 |
| 2,114,976 | A | * | 4/1938 | Eastburg | B60B 37/04 105/79 |
| 2,565,760 | A | * | 8/1951 | Danly | B62D 55/15 184/6.14 |
| 2,858,175 | A | * | 10/1958 | Sutherland | F16C 33/6607 184/109 |
| 3,061,387 | A | * | 10/1962 | Laws | F16C 33/6659 384/472 |
| 3,612,632 | A | * | 10/1971 | Woodling | F16C 19/364 384/132 |

(Continued)

FOREIGN PATENT DOCUMENTS

| EP | 2090795 A2 * | 8/2009 | ............. F16C 19/364 |
| JP | 2006177515 A * | 7/2006 | ............. F16C 19/364 |

(Continued)

*Primary Examiner* — Marcus Charles
(74) *Attorney, Agent, or Firm* — Oliff PLC (57) ABSTRACT

A rotary device includes: a housing that accommodates a shaft; and a rolling bearing. The rolling bearing includes an outer ring that is attached to the housing, an inner ring that rotates integrally with the shaft, a plurality of tapered rollers, and a cage, and is configured to generate pumping action that causes fluid to flow with an axial component in a bearing annular space when the shaft rotates. A space in the housing on one side of the rolling bearing in the axial direction is a space that is closed except a side close to the rolling bearing. The rolling bearing further includes an oil reservoir portion provided to an end portion of the outer ring in the axial direction and configured to store lubricant between the oil reservoir portion and the outer ring.

4 Claims, 10 Drawing Sheets

(56) References Cited

U.S. PATENT DOCUMENTS

| | | | | |
|---|---|---|---|---|
| 5,992,943 A | * | 11/1999 | Sheets | B60B 27/001 29/898.062 |
| 9,644,672 B2 | * | 5/2017 | Nagai | F16C 19/364 |
| 2006/0245678 A1 | * | 11/2006 | Chiba | F16C 19/364 384/571 |
| 2008/0219606 A1 | * | 9/2008 | Sada | F16C 19/364 384/286 |
| 2008/0230289 A1 | * | 9/2008 | Schoon | B60K 1/02 180/65.6 |
| 2015/0176649 A1 | * | 6/2015 | Okamoto | F16C 33/6681 384/571 |
| 2016/0281773 A1 | * | 9/2016 | Nagai | F16C 19/364 |

FOREIGN PATENT DOCUMENTS

| | | | |
|---|---|---|---|
| JP | 2013-148177 A | 8/2013 | |
| WO | WO-2007077706 A1 * | 7/2007 | ......... F16C 33/6625 |

* cited by examiner

AXIAL DIRECTION
(OTHER SIDE) ⟵⟶ (ONE SIDE)

ROTARY DEVICE

INCORPORATION BY REFERENCE

The disclosure of Japanese Patent Application No. 2017-135378 filed on Jul. 11, 2017 including the specification, drawings and abstract, is incorporated herein by reference in its entirety.

BACKGROUND OF THE INVENTION

1. Field of the Invention

The present invention relates to a rotary device including a housing that accommodates a shaft and a rolling bearing via which the shaft is rotatably supported by the housing.

2. Description of Related Art

In a rotary device such as a transaxle or a transmission of an automobile, for example, a plurality of shafts are provided in a housing, and a gear or the like for transmitting power is attached to each shaft. Each shaft is supported by the housing via a bearing. In order to prevent seizure of the bearing, for example, a hole for supplying lubricant is formed in the housing (see FIG. 4 in Japanese Patent Application Publication No. 2013-148177, for example).

Figure 10:
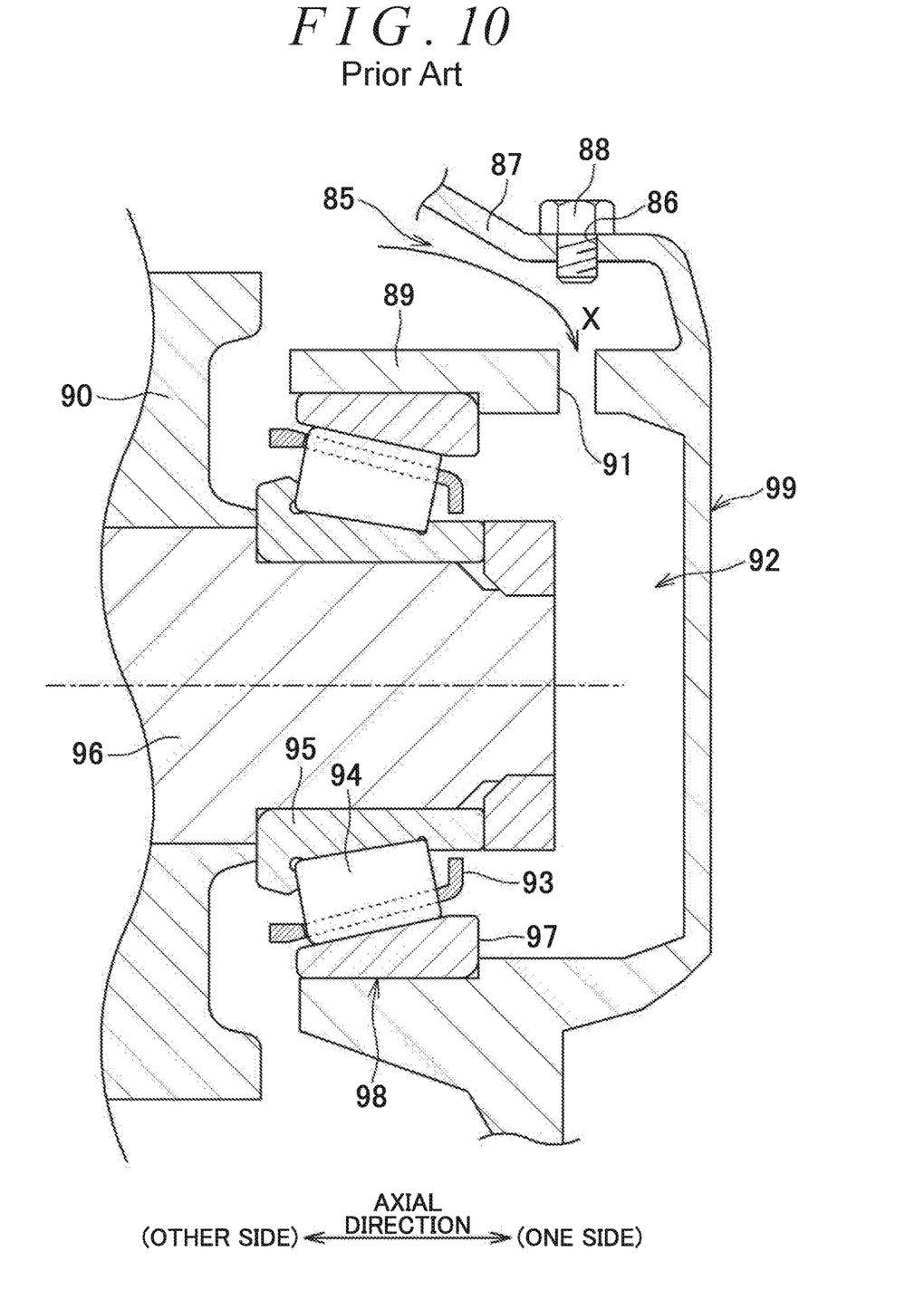
FIG. 10 is a sectional view of a housing and a bearing in a related art.

FIG. 10 is a sectional view of a housing 99 and a bearing 98 in a related art. The bearing 98 includes an outer ring 97, an inner ring 95, a plurality of rolling elements (tapered rollers) 94, and a cage 93. The outer ring 97 is attached to the housing 99. The inner ring 95 rotates integrally with a shaft 96. The cage 93 supports the rolling elements 94. The bearing 98 is a rolling bearing, via which the shaft 96 is rotatably supported by the housing 99.

In the housing 99, a space 92 is formed on one side of the bearing 98 in the axial direction, and a lubrication hole 91 communicating with the space 92 is formed. Around a gear 90 that rotates integrally with the shaft 96, a relatively large amount of lubricant exists. Thus, when the gear 90 rotates, the lubricant therearound is scooped up. As indicated by the arrow X, the lubricant is supplied to the space 92 through the lubrication hole 91. The lubricant thus supplied to the space 92 is used to lubricate the bearing 98, thereby preventing seizure or the like of the bearing 98.

Forming the lubrication hole 91 requires an operation of forming a large through hole in an inner wall 89 of the housing 99. Furthermore, also in an outer wall 87 of the housing 99, a hole 86 through which a tool for forming the lubrication hole 91 is inserted needs to be formed. After the lubrication hole 91 is formed in the inner wall 89, threading is performed so that the hole 86 can be used as a bolt hole. Into this hole 86, an oil retaining bolt 88 is attached.

As described above, in this related art, in order to maintain lubrication of the bearing 98, in addition to forming the lubrication hole 91 in the housing 99, drilling for this forming needs to be performed also in the outer wall 87. Furthermore, the oil retaining bolt 88 is needed to close the hole 86 formed in the outer wall 87. Thus, man-hours for machining the housing 99 increase and the number of components also increases, which increases the costs. In addition, a space for forming the large lubrication hole 91 is needed, and also a flow passage 85 passing through from the gear 90 side to the lubrication hole 91 needs to be formed. This will upsize the housing 99.

SUMMARY OF THE INVENTION

An object of the present invention is to provide a rotary device that can maintain lubrication of a bearing supporting a shaft in a housing, without forming a large through hole for supplying lubricant and machining for this forming, for example, as in the related art.

A rotary device according to one aspect of the present invention includes: a housing that accommodates a shaft; and a rolling bearing including an outer ring that is attached to the housing, an inner ring that rotates integrally with the shaft, a plurality of rolling elements provided between the outer ring and the inner ring, and a cage that holds the rolling elements. The rolling bearing is configured to generate pumping action that causes fluid to flow with an axial component in a bearing annular space between the inner ring and the outer ring when the shaft rotates. A space in the housing on one side of the rolling bearing in the axial direction is a space that is closed except a side close to the rolling bearing, and the rolling bearing further includes an oil reservoir portion provided to an end portion of the outer ring in the axial direction and configured to store lubricant between the oil reservoir portion and the outer ring.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
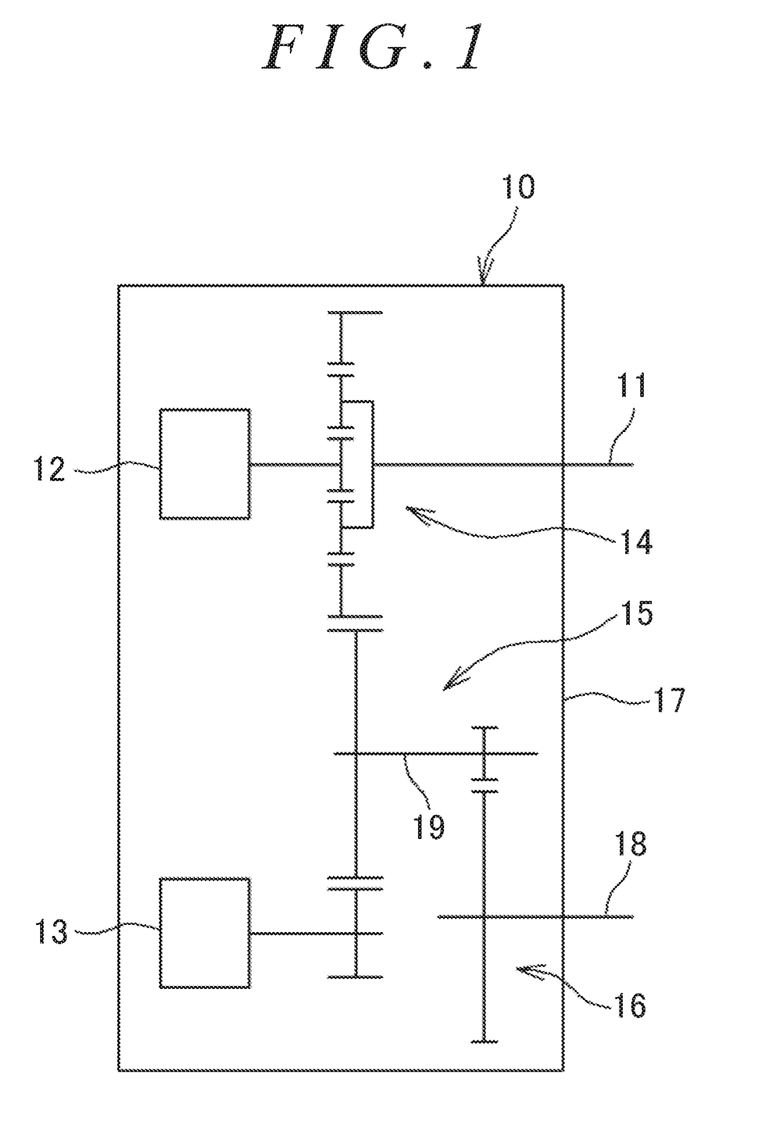
FIG. 1 is a schematic diagram illustrating one example of a rotary device of the present invention.

FIG. 1 is a schematic diagram illustrating one example (embodiment) of a rotary device of the present invention. This rotary device 10 depicted in FIG. 1 is a transaxle of an electric car. The rotary device 10 includes an input shaft 11 to which power is input from an engine (not depicted), a first motor 12, a second motor 13, a power transmission mechanism 14, a counter gear mechanism 15, a differential gear mechanism 16, and a housing 17. The first motor 12 can generate electricity by rotation of the engine (not depicted) in order to obtain electric power for driving the second motor 13. The power transmission mechanism 14 includes a plurality of gears, and transmits rotation of the input shaft 11 to the counter gear mechanism 15. The second motor 13 generates driving force for causing a vehicle to travel, and also has a function of regenerating inertial force of the vehicle during deceleration into electric energy. The counter gear mechanism 15 includes a gear that meshes with a gear of the power transmission mechanism 14 and a gear that meshes with an output gear of the second motor 13. The counter gear mechanism 15 transmits rotational force of the power transmission mechanism 14 and rotational force of the second motor 13 to the differential gear mechanism 16. The differential gear mechanism 16 outputs the rotational force from the counter gear mechanism 15 to driving wheels (not depicted) via an output shaft 18. The respective mechanisms are accommodated in the housing 17. Gears and other components included in the respective mechanisms are rotatable integrally with the corresponding shafts, and each shaft is rotatably supported by the housing 17 via a bearing.

Figure 2:
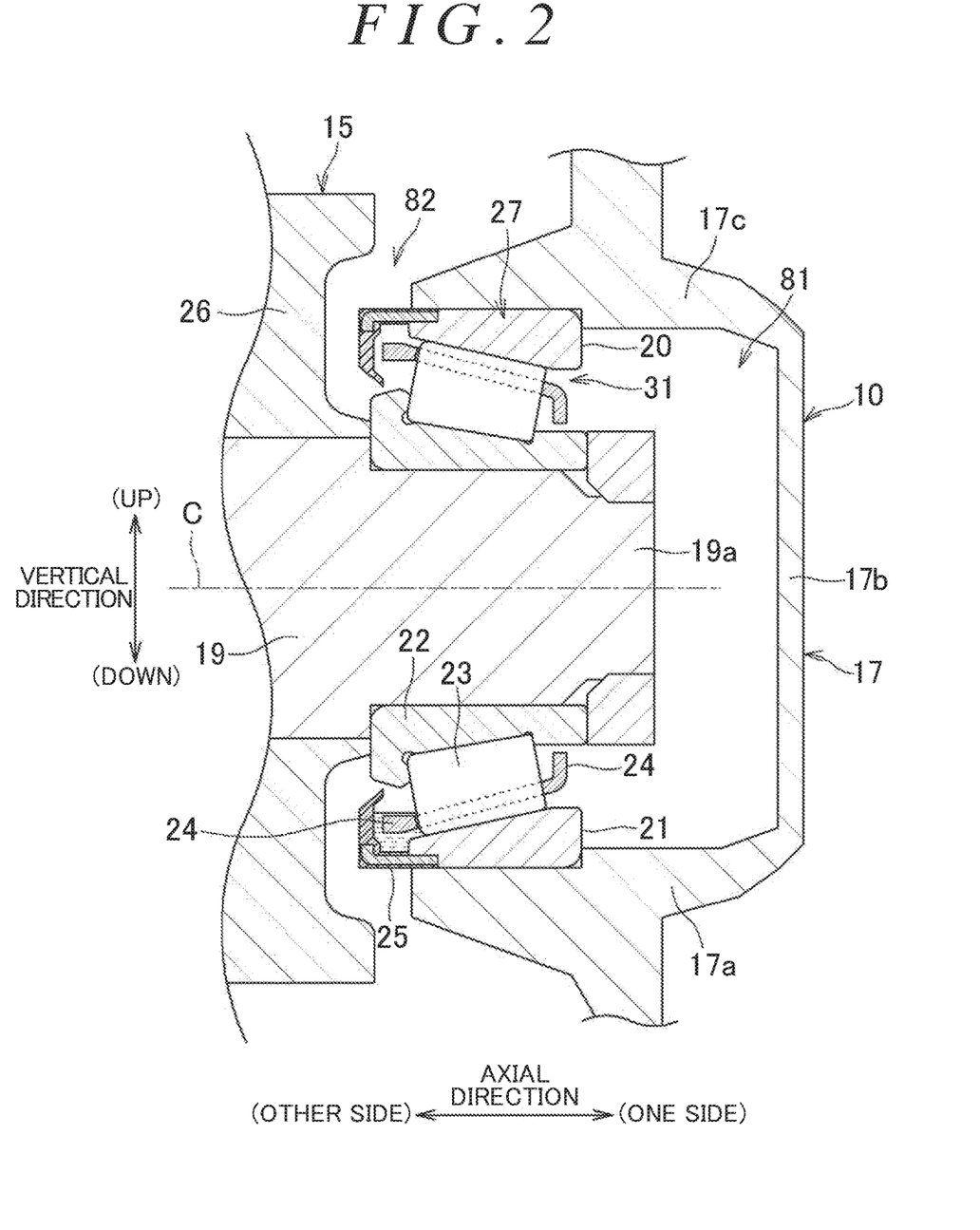
FIG. 2 is a sectional view illustrating part of a counter gear mechanism and part of a housing illustrated in FIG. 1.

FIG. 2 is a sectional view illustrating part of the counter gear mechanism 15 and part of the housing 17 illustrated in FIG. 1. The counter gear mechanism 15 includes a countershaft 19 accommodated in the housing 17. To this countershaft 19, a counter gear 26 is attached. Hereinafter, the countershaft 19 and the counter gear 26 are simply referred to as "shaft 19" and "gear 26", respectively. In the housing 17, an annular attachment space 27 is formed. Into this attachment space 27, a rolling bearing 20 is attached. Via this rolling bearing 20, the shaft 19 is configured to be rotatably supported by the housing 17.

Hereinafter, a direction extending along the central axis C of the shaft 19 (and a direction parallel to the central axis C) is referred to as "axial direction", and a direction orthogonal to the central axis C is referred to as "radial direction". In FIG. 2, the right-and-left direction is the axial direction. In FIG. 2, the right side is defined as axially one side, and the left side is defined as the axially other side. The central axis of the rolling bearing 20 is the same as the central axis C of the shaft 19.

The rolling bearing 20 includes an outer ring 21, an inner ring 22, a plurality of rolling elements, and an annular cage 24. The outer ring 21 is attached to a portion 17a of the housing 17. The inner ring 22 rotates integrally with the shaft 19. The rolling elements are provided between the outer ring 21 and the inner ring 22. The cage 24 holds the rolling elements. The rolling elements of the present embodiment are tapered rollers 23. The rolling bearing 20 depicted in FIG. 2 is a tapered roller bearing. The rolling bearing 20 further includes an oil reservoir portion 25 that is integrated into the outer ring 21. The oil reservoir portion 25, as described later, is provided to an end portion of the outer ring 21 in the axial direction, and in lower part thereof, lubricant can be stored between the oil reservoir portion and the outer ring 21. Details of a configuration and functions of the oil reservoir portion 25 will be described later.

Figure 3:
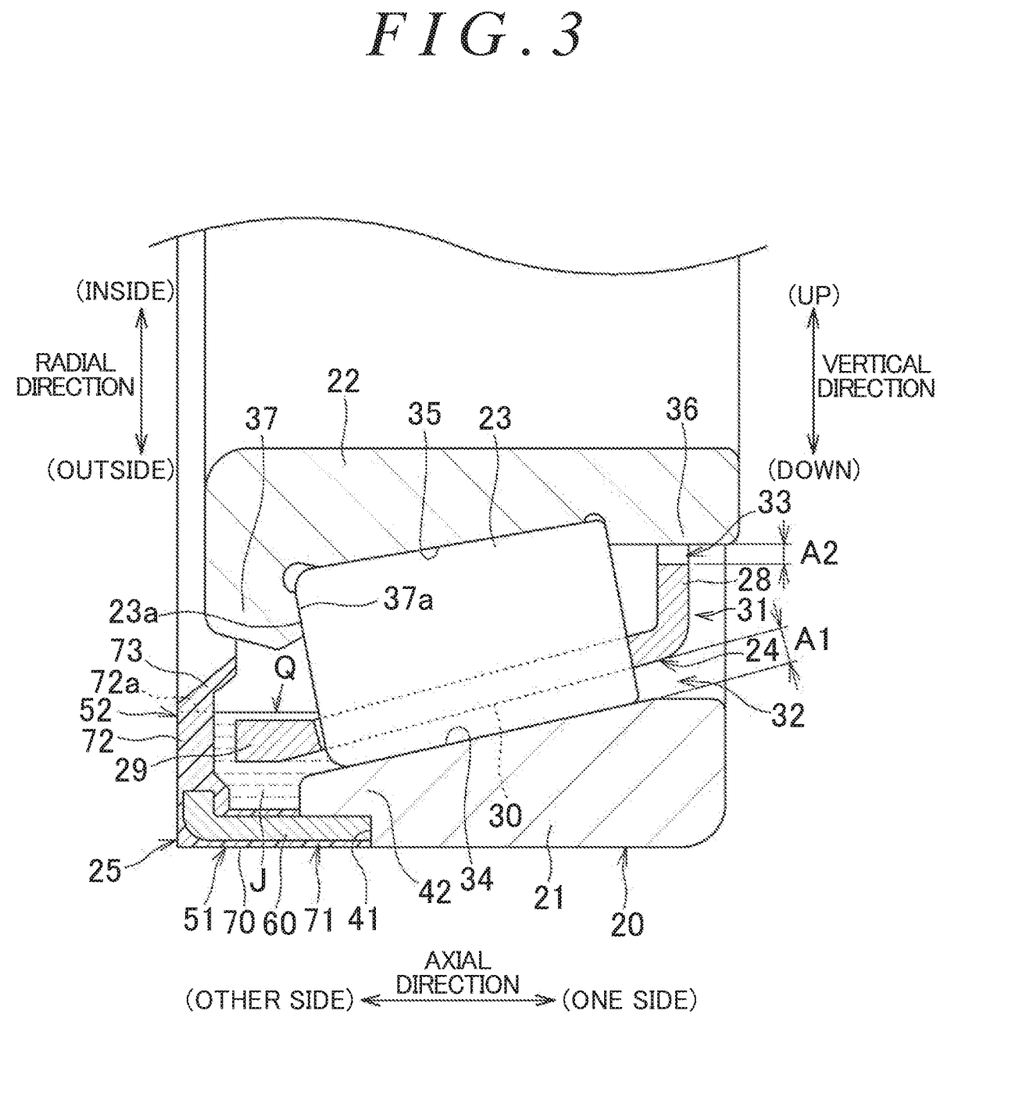
FIG. 3 is a sectional view in lower part of a rolling bearing.

FIG. 3 is a sectional view in lower part of the rolling bearing 20. The outer ring 21 is a cylindrical member, and on an inner peripheral side thereof, an outer raceway surface 34 that is in rolling contact with the tapered rollers 23 is formed. The outer raceway surface 34 has a shape (tapered shape) the diameter of which decreases toward the axially one side. The inner ring 22 is a cylindrical member, and on an outer peripheral surface thereof, an inner raceway surface 35 that is in rolling contact with the tapered rollers 23 is formed. The inner raceway surface 35 has a shape (tapered shape) the diameter of which decreases toward the axially one side. On the inner raceway surface 35 on the axially one side, a cone front face rib (hereinafter, referred to as a small rib) 36 protruding radially outward is formed. On the inner raceway surface 35 on the axially other side, a cone back face rib (hereinafter, referred to as a large rib) 37 protruding radially outward is formed. The large rib 37 is larger in diameter than the small rib 36. With a side surface 37a of the large rib 37 on the axially one side, a large end face 23a that is an end face of each tapered roller 23 the diameter of which is larger is in contact. When the inner ring 22 rotates, the large end face 23a is in sliding contact with the side surface 37a. These surfaces 23a and 37a that are in sliding contact with each other can be lubricated with later-described lubricant in the oil reservoir portion 25.

Between the outer ring 21 and the inner ring 22, an annular space 31 (hereinafter, referred to as "bearing annular space 31") is formed. In this bearing annular space 31, the tapered rollers 23 and the cage 24 are provided. The cage 24 has a first annular body (annular portion) 28 having an annular shape, a second annular body (annular portion) 29 having an annular shape, and a plurality of bars (cage bars) 30. The first annular body 28 is positioned on the axially one side of the tapered rollers 23. The second annular body 29 is positioned on the axially other side of the tapered roller 23. The bars (cage bars) 30 connect these annular bodies 28 and 29. A space between the annular bodies 28 and 29 and between bars 30 and 30 that are adjacent to each other in the circumferential direction is a pocket that accommodates each tapered roller 23.

The bearing annular space 31 is open to the axially one side and to the axially other side. The first annular body 28 has an annular shape. Thus, an outer annular space 32 having an annular shape is formed between the outer ring 21 and the annular body 28, and an inner annular space 33 having an annular shape is formed between the inner ring 22 and the annular body 28.

In this rolling bearing 20, when the inner ring 22 rotates, an action that causes fluid to flow from the axially one side to the axially other side is generated in the bearing annular space 31. This is due to the following reason. Specifically, when the rolling bearing 20 (inner ring 22) rotates, lubricant in the bearing annular space 31 rotates together with the tapered rollers 23 and the cage 24. Especially when they rotate at high speed, the lubricant (air containing the lubricant) flows radially outward due to centrifugal force, comes into contact with the inner peripheral surface (outer raceway surface 34) of the outer ring 21, and flows along the inner peripheral surface toward the axially other side. In other words, the lubricant (and the air) flows toward the large end faces 23a of the tapered rollers 23. Accordingly, the air on the axially one side of the rolling bearing 20 passes through the bearing annular space 31. Consequently, pumping action that causes lubricant to flow toward the axially other side is generated. As described later, in FIG. 2, when a space (first space 81) on the axially one side of the rolling bearing 20 is a closed space, or when the pressure therein becomes negative with respect to the pressure in a second space 82 on the axially other side of the rolling bearing 20, the pumping action becomes weak and may disappear.

The rolling bearing that generates the pumping action is not limited to the rolling bearing (tapered roller bearing) 20 depicted in FIG. 3, and a rolling bearing of another type can generate such pumping action. The reason described above on generation of the pumping action is one factor, and the pumping action may be generated due to another factor. As described above, when the rolling bearing 20 depicted in FIG. 2 rotates, the pumping action that causes fluid to flow with an axial component in the bearing annular space 31 may be generated. In the present embodiment, the oil reservoir portion 25 having an annular shape is provided to the end portion of the outer ring 21 on the axially other side. With this configuration, lubricant that is caused to flow along the inner peripheral surface of the outer ring 21 toward the axially other side by the pumping action can be stored in the oil reservoir portion 25.

In FIG. 2, the housing 17 accommodates the shaft 19 that rotates integrally with the gear 26. This shaft 19 is rotatably supported by the housing 17 via the rolling bearing 20. An end portion 19*a* of the shaft 19 on the axially one side is arranged close to an outer wall portion 17*b* of the housing 17 in the axial direction. The outer wall portion 17*b* is a disk-like portion, and around this outer wall portion 17*b*, a wall portion 17*c* the inner peripheral surface of which has a cylindrical shape is formed. The outer wall portion 17*b* and the wall portion 17*c* having a cylindrical shape are formed continuously. No clearance or hole is formed on the entire area of the outer wall portion 17*b* and the wall portion 17*c* having a cylindrical shape. A space formed on the axially other side of the outer wall portion 17*b* and on the inner peripheral side of the cylindrical wall portion 17*c* is the first space 81. On the axially other side of the first space 81, the attachment space 27 the diameter of which is larger than that of the first space 81 is formed. Into this attachment space 27, the rolling bearing 20 is attached. As described above, in the embodiment depicted in FIG. 2, the first space 81 in the housing 17 on the axially one side of the rolling bearing 20 is a space that is closed except a side close to the rolling bearing 20. In other words, the first space 81 communicates with the second space 82 on the axially other side of the rolling bearing 20 through the bearing annular space 31, and the first space 81 is a space that is closed except this bearing annular space 31.

The end portion of the outer ring 21 on the axially other side is provided with the oil reservoir portion 25. The oil reservoir portion 25 can store lubricant between the oil reservoir portion and the outer ring 21. With the configuration of the counter gear mechanism 15 described above, a through hole (lubrication hole) communicating with the first space 81 on the axially one side of the rolling bearing 20 is not formed in the housing 17. If this first space 81 is a closed space, the pressure in the first space 81 becomes negative (with respect to the pressure in the second space 82) due to the pumping action. When the rolling bearing 20 continues to rotate, the pumping action soon becomes weak. Consequently, the amount of lubricant passing through the bearing annular space may decrease. However, lubricant stored between the outer ring 21 and the oil reservoir portion 25 is used to lubricate the rolling bearing 20, whereby lubrication can be maintained.

Figure 4:
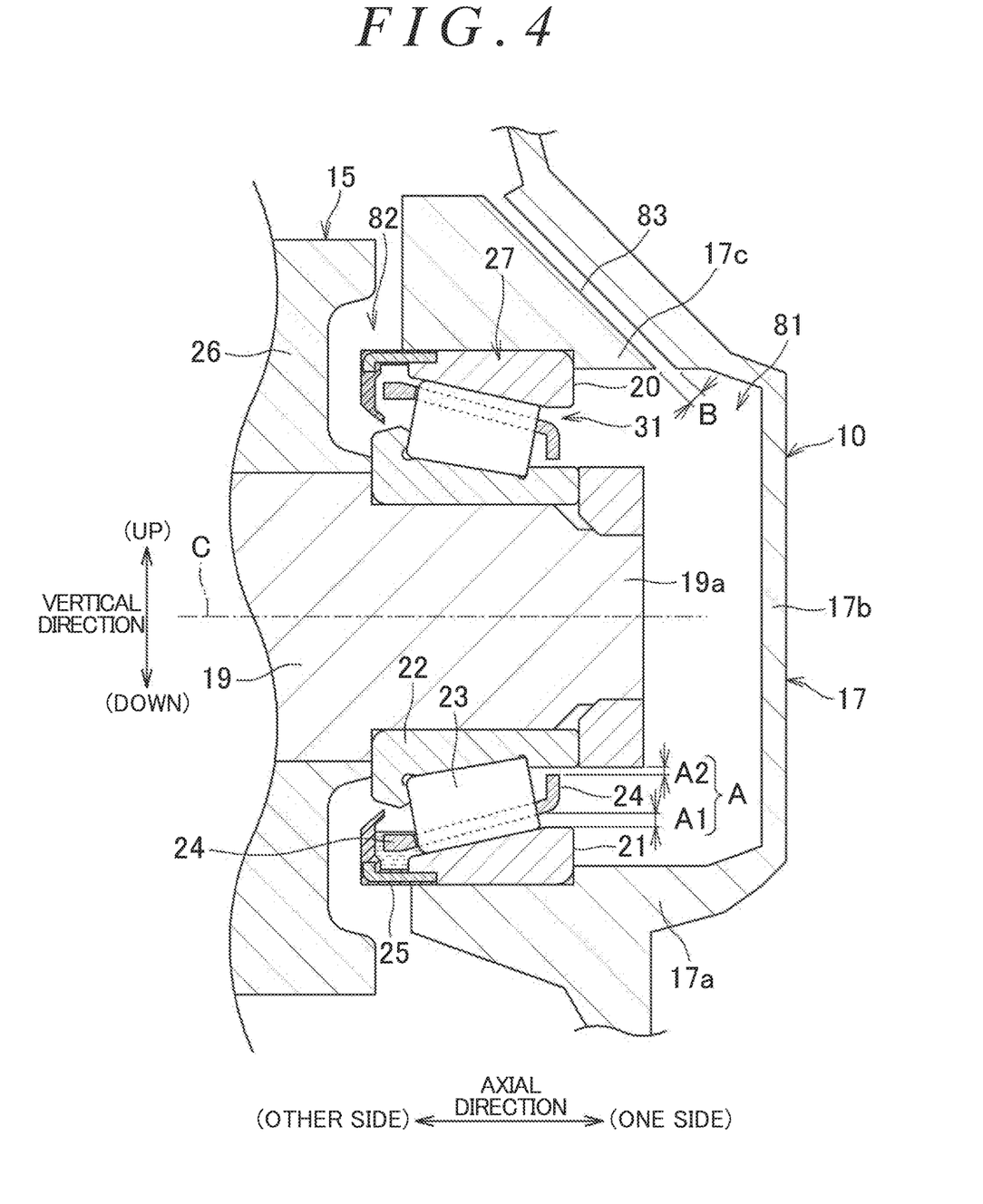
FIG. 4 is a sectional view for explaining a modification of the housing.

FIG. 4 is a sectional view for explaining a modification of the housing 17. The embodiment depicted in FIG. 4 is the same as the embodiment depicted in FIGS. 2 and 3 except that the shape of the housing 17 is partially different. The following mainly describes differences from the previous embodiment.

In FIG. 4, the housing 17 has an outer wall portion 17*b* and a wall portion 17*c* the inner peripheral surface of which has a cylindrical shape, similarly to the embodiment depicted in FIG. 3. In the embodiment depicted in FIG. 4, in part (upper portion) of the wall portion 17*c* having a cylindrical shape, a through hole 83 is formed. This through hole 83 passes through from the second space 82 in the housing 17 on a side where the gear 26 is provided to the first space 81 on the axially one side of the rolling bearing 20.

As described above, in the wall portion 17*c* of the housing 17, the through hole 83 communicating with the first space 81 on the axially one side of the rolling bearing 20 is formed.

This through hole 83 is not a hole for supplying lubricant to the rolling bearing 20, and is a hole for weight reduction, for example. The cross-sectional area thereof is small. Specifically, the minimum cross-sectional area B of the through hole 83 is smaller than an opening area A that is formed between the outer ring 21 and the inner ring 22 on the axially one side. The following describes the opening area A. In the rolling bearing 20 of the present embodiment (see FIG. 3), the annular body 28 of the cage 24 is positioned in the bearing annular space 31 on the axially one side. Thus, the opening area A is equal to the sum of an opening area A1 of the outer annular space 32 formed between the outer ring 21 and the annular body 28 and an opening area A2 of the inner annular space 33 formed between the inner ring 22 and the annular body 28. Needless to say, the opening area A (A1, A2) is the sum (sum total) of areas of openings of the bearing annular space 31 (the outer annular space 32 and the inner annular space 31) on the axially one side along the entire circumference in the circumferential direction.

In the embodiment depicted in FIG. 4, the cross-sectional shape of the through hole 83 is uniform along the hole longitudinal direction, and thus the minimum cross-sectional area B of the through hole 83 is indicated as an area of the through hole 83 at a position closest to the first space 81. However, the minimum cross-sectional area B is not limited to this position, and is an area at a position where the cross-sectional area is smallest. The first space 81 is formed from the position of the minimum cross-sectional area B that serves as a boundary. The through hole 83 may be formed for any purpose other than the purpose of weight reduction if the minimum cross-sectional area B thereof is smaller than the opening area A.

In the same manner as above, in the embodiment depicted in FIG. 4, the oil reservoir portion 25 is provided to the end portion of the outer ring 21 on the axially other side. The oil reservoir portion 25 can store lubricant between the oil reservoir portion 25 and the outer ring 21. In such a configuration including the housing 17 and the rolling bearing 20, even when the through hole 83 communicating with the first space 81 is formed in the wall portion 17*c* of the housing 17, the cross-sectional area (B) thereof is smaller than the opening area A. Thus, when the rolling bearing 20 continues to rotate, the pressure in the first space 81 becomes negative (with respect to the pressure in the second space 82) due to the pumping action, and the pumping action soon becomes weak. Consequently, the amount of lubricant passing through the bearing annular space 31 may decrease. However, lubricant stored between the outer ring 21 and the oil reservoir portion 25 is used to lubricate the rolling bearing 20, whereby lubrication can be maintained. In the embodiment depicted in FIG. 4, the through hole 83 is the only one hole communicating with the first space 81. Except the through hole 83 and the side closer to the rolling bearing 20 (attachment space 27), the first space 81 is a closed space (similarly to the embodiment depicted in FIG. 2).

As depicted in each of FIG. 2 and FIG. 4, in the rotary device of the corresponding example, when the rolling bearing 20 continues to rotate, the pressure in the first space 81 in the housing 17 on the axially one side of the rolling bearing 20 becomes negative, due to the pumping action, with respect to the pressure in the second space 82 therein on the axially other side of the rolling bearing 20. As described above, when a through hole communicating with the first space 81 is not formed in the housing 17 (see FIG. 2) or even when the through hole 83 is formed but the cross-sectional area (B) thereof is small (see FIG. 4), the pressure in the first space 81 becomes negative due to the pumping action caused by rotation of the rolling bearing 20. Accordingly, the pumping action soon becomes weak. Consequently, the amount of lubricant passing through the bearing annular space 31 may decrease. However, lubricant stored between the outer ring 21 and the oil reservoir portion 25 is used to lubricate the rolling bearing 20, whereby lubrication can be maintained. In other words, without forming the large through hole 91 (see FIG. 10) for lubrication in the housing 17 and machining for this forming, for example, as in the related art, lubrication of the rolling bearing 20 can be maintained.

Thus, unlike the related art, man-hours for machining the housing 17 and the number of components can be reduced, whereby costs can be reduced. Furthermore, in the housing 17, a space for forming a large lubrication hole is not necessary, and thus downsizing and weight reduction of the housing 17 can be achieved. Consequently, lubrication maintained in the rolling bearing 20 increases the life-span thereof, whereby the life-span of the rotary device can be increased.

In FIG. 3, on an outer peripheral side of the outer ring 21, an annular step surface 41 is formed. The step surface 41 is formed on the axially other side of an axially central portion of the outer ring 21. The step surface 41 is a surface extending along a plane orthogonal to the central axis of the outer ring 21, and is formed continuously along the circumferential direction. In other words, the step surface 41 has an annular shape when viewed from the axially other side. An end portion of the outer ring 21 on the axially other side of the step surface 41 is formed to be a thin portion 42 the radial thickness of which is smaller than that on the axially one side. The oil reservoir portion 25 is attached to this thin portion 42 so as to be fitted thereonto. As described above, the oil reservoir portion 25 of the present embodiment is a member that is separate from the outer ring 21, and is attached to the end portion (thin portion 42) of the outer ring 21 on the axially other side. The oil reservoir portion 25 is an annular member that is attached to the outer ring 21 coaxially with the central axis of the outer ring 21.

Figure 5:
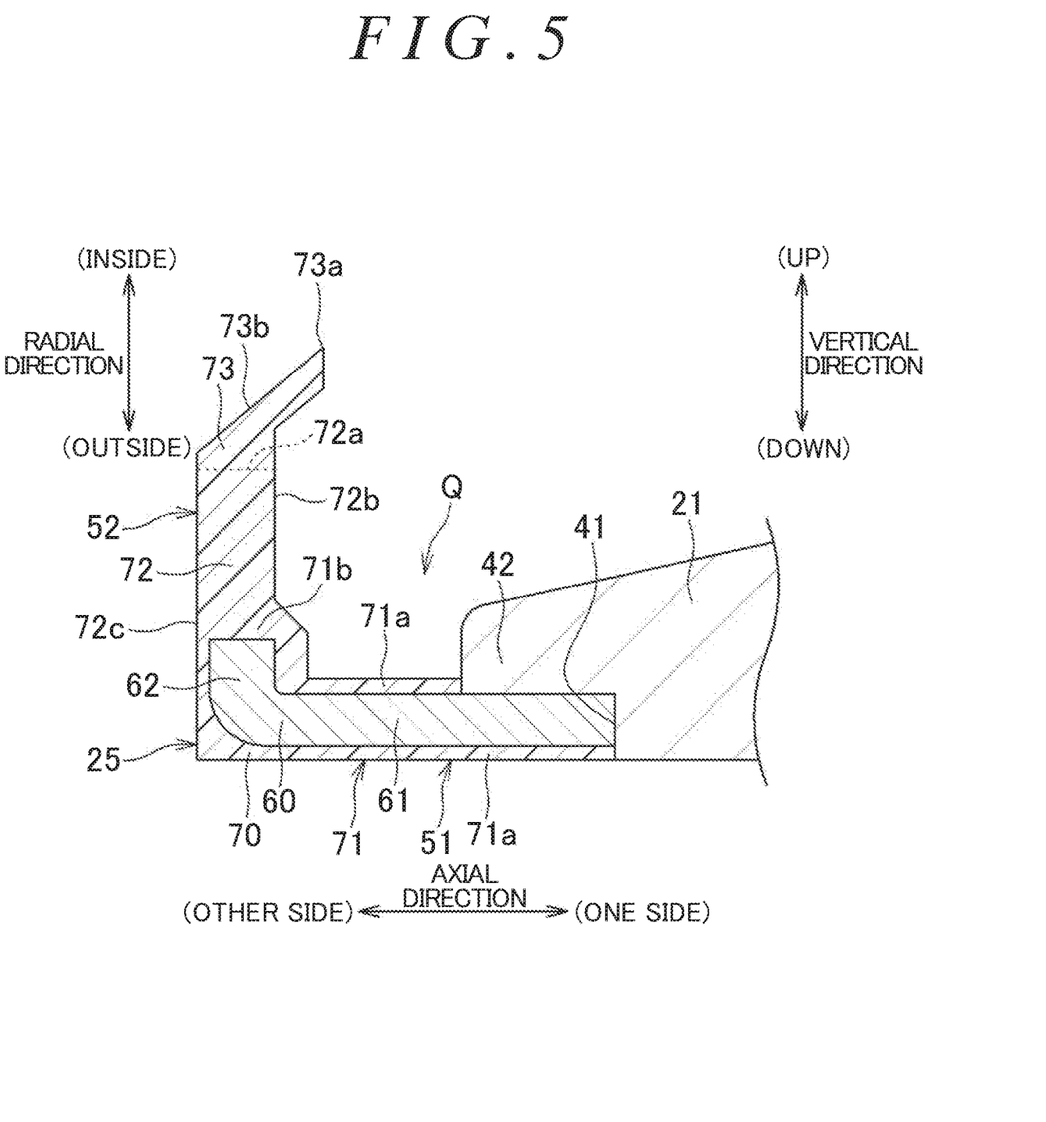
FIG. 5 is a sectional view illustrating lower part of an oil reservoir portion having an annular shape and its surroundings.

FIG. 5 is a sectional view illustrating lower part of the oil reservoir portion 25 having an annular shape and its surroundings. The oil reservoir portion 25 includes a ring 60 and a lip 70.

The ring 60 has a ring body portion 61 having a cylindrical shape and a flange portion 62 having an annular shape. The flange portion 62 protrudes radially inward from the ring body portion 61 on the axially other side. The ring body portion 61 and the flange portion 62 are formed of the same member. The bore diameter of the ring body portion 61 is slightly smaller than the outside diameter of the thin portion 42, and is formed in such a size that the thin portion 42 can be press-fitted into the ring body portion 61. By fitting the ring body portion 61 onto the thin portion 42, the oil reservoir portion 25 can be fixed to the outer ring 21. The ring 60 is made of metal. The lip 70 is made of, for example, elastic resin or rubber (e.g., nitrile rubber or acrylic rubber), and is fixed to the ring 60. The ring 60 serves as a core metal of the oil reservoir portion 25.

Figure 6:
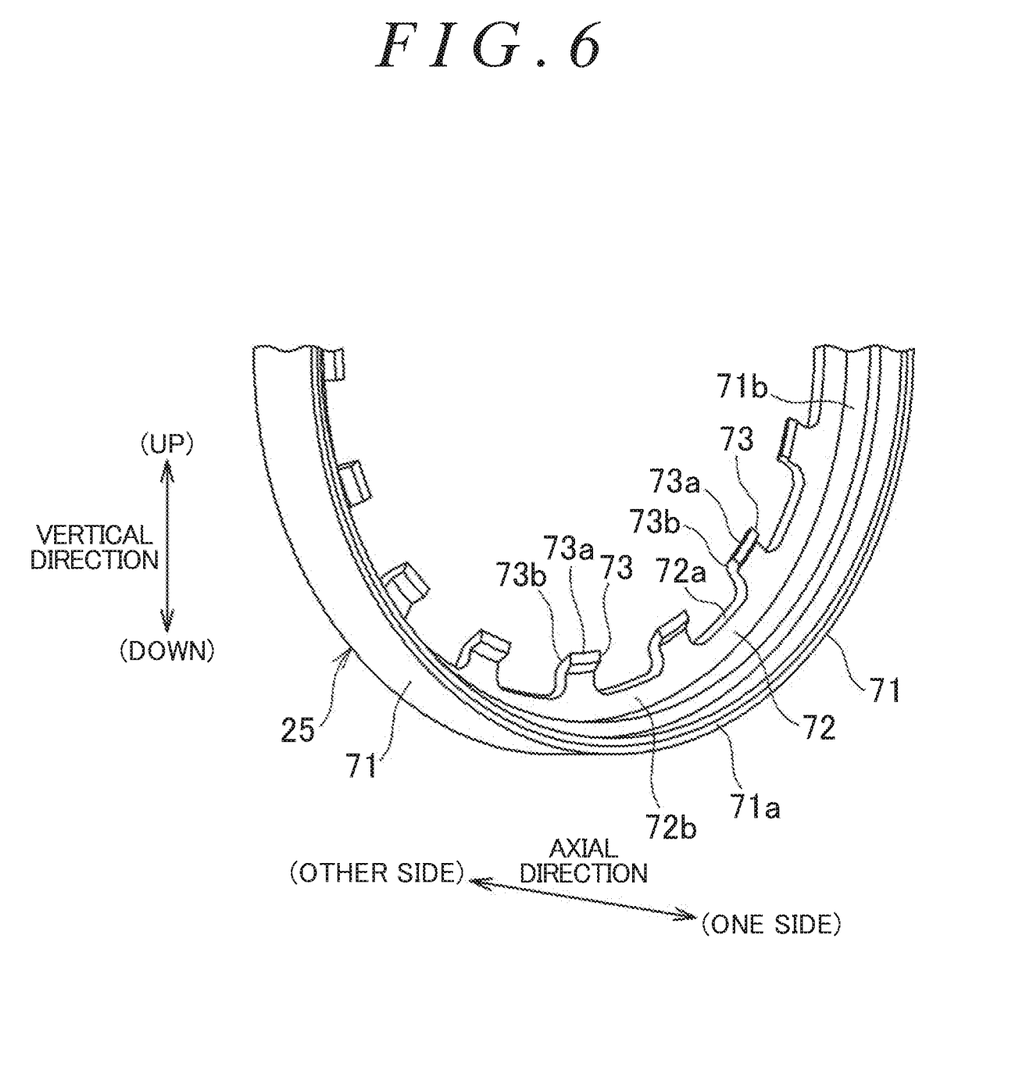
FIG. 6 is a perspective view of part (lower half) of the oil reservoir portion when viewed from one side in the axial direction.

In FIG. 5 and FIG. 6, the lip 70 has a ring coating portion 71, a lip body portion 72, and a plurality of protrusions 73. FIG. 6 is a perspective view of part (lower half) of the oil reservoir portion 25 when viewed from the axially one side. In FIG. 5, the ring coating portion 71 is a portion that covers the ring body portion 61. The ring coating portion 71 has a body coating portion 71a and a flange coating portion 71b. The body coating portion 71a covers the ring body portion 61 from its outer peripheral side and its inner peripheral side. The flange coating portion 71b covers the flange portion 62. The lip body portion 72 is an annular portion that continuously extends radially inward from the ring coating portion 71 (flange coating portion 71b).

Figure 7:
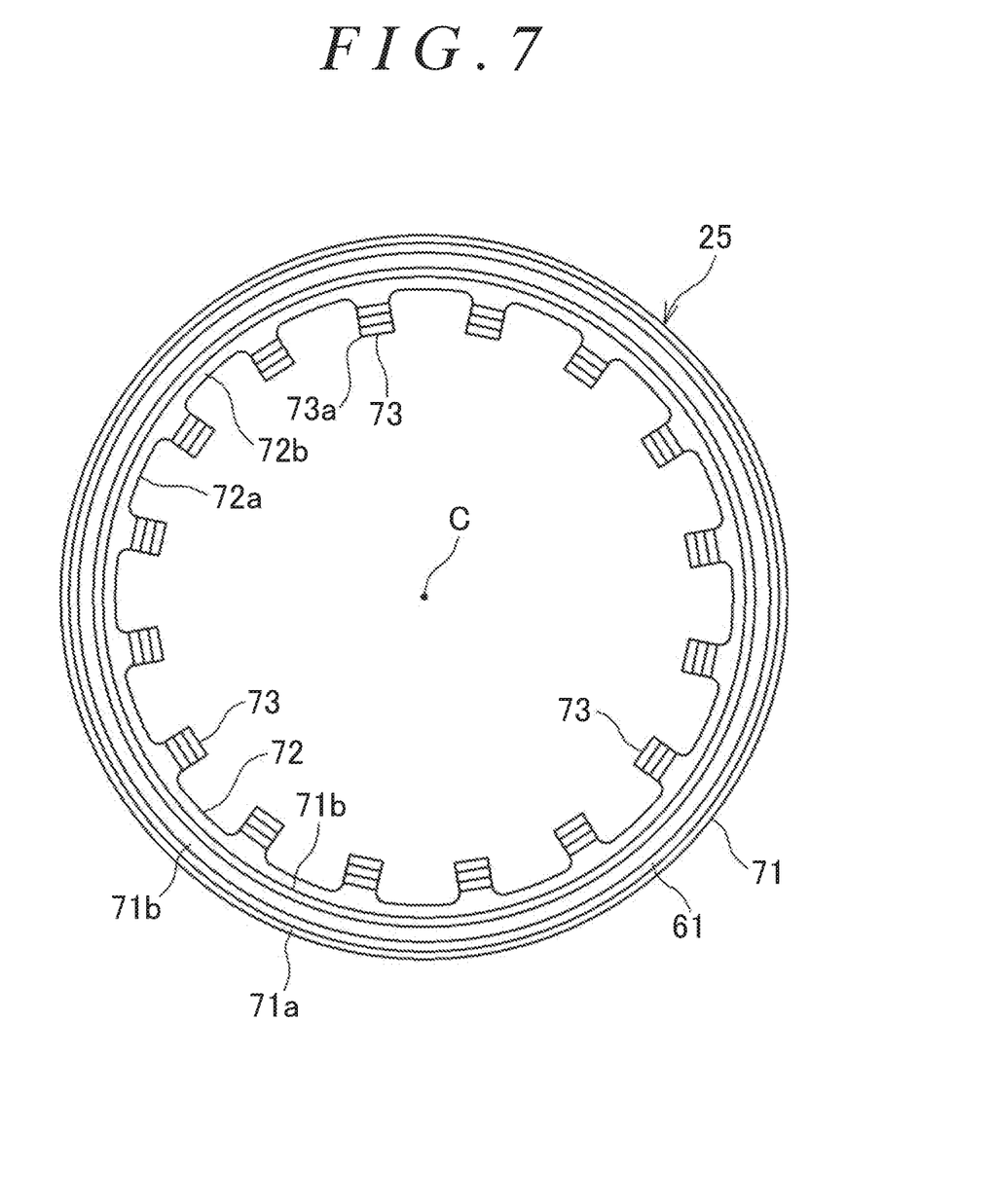
FIG. 7 is a diagram of the oil reservoir portion when viewed from the one side in the axial direction.

FIG. 7 is a diagram of the oil reservoir portion 25 when viewed from the axially one side. The protrusions 73 are arranged at regular intervals along the circumferential direction. The number of the protrusions 73 is preferably the same as the number of the tapered rollers 23 included in the rolling bearing 20. The reason for this will be described later. The respective protrusions 73 protrude radially inward from an inner periphery 72a of the lip body portion 72. In the present embodiment (see FIG. 5 and FIG. 6), the respective protrusions 73 protrude radially inward and toward the axially one side from the inner periphery 72a of the lip body portion 72. The shape of each protrusion 73 will be further described. The shape of each protrusion 73 is rectangular when viewed from the axial direction (see FIG. 7). However, as depicted in FIG. 6, each protrusion 73 extends radially inward from the inner periphery 72a of the lip body portion 72, and further has a claw-like shape bending toward the axially one side. Thus, as depicted in FIG. 5, a radially inner distal end 73a of the protrusion 73 is positioned on the axially one side with respect to a side surface 72b of the lip body portion 72 on the axially one side.

As depicted in FIG. 5, the protrusion 73 has an inclined surface 73b on the axially other side. The inclined surface 73b has a shape extending along an imaginary tapered surface the diameter of which decreases from the axially other side toward the axially one side. An end portion of the inclined surface 73b on the axially one side corresponds to the distal end 73a of the protrusion 73. An end portion of the inclined surface 73b on the axially other side is continuous with a side surface 72c of the lip body portion 72 (oil reservoir portion 25) on the axially other side.

As described above, the ring 60 and the lip 70 are integrated to form the oil reservoir portion 25. The ring body portion 61 of the ring 60 and the body coating portion 71a of the lip 70 form a cylindrical portion 51 having a cylindrical shape that extends from the outer ring 21 toward the axially other side. The flange portion 62 of the ring 60 and the flange coating portion 71b and the lip body portion 72 of the lip 70 form an annular portion 52 having an annular shape that extends radially inward from the cylindrical portion 51. The protrusions 73 protrude from the inner periphery 72a of the annular portion 52. Thus, the oil reservoir portion 25 has the cylindrical portion 51, the annular portion 52, and the protrusions 73 that are integrated. In the present embodiment, each protrusion 73 protrudes with a component extending (from a radially intermediate portion thereof) toward a bearing inner side (the axially one side) that is a side on which the tapered rollers 23 are provided. Although not depicted, each protrusion 73 may protrude only radially inward without protruding in the axial direction.

As depicted in FIG. 3, the oil reservoir portion 25 is fitted onto part of the outer ring 21 to be integrated into the outer ring 21. In a vertically lower space (space positioned at the bottom) in a space formed between the outer ring 21 and the oil reservoir portion 25, lubricant J is stored. In other words, the lubricant J is stored in a lower portion of the rolling bearing 20. The height (maximum value) of a liquid level of the lubricant J is a height at a lowest position of the inner periphery 72a of the annular portion 52 (lip body portion 72) included in the oil reservoir portion 25.

The lubricant J stored between the oil reservoir portion 25 and the outer ring 21 comes into contact with part of the outer ring 21, part of each tapered roller 23, and part of the cage 40. When the rolling bearing 20 rotates, the stored lubricant J is supplied to the inner raceway surface 35 and the side surface 37a of the large rib 37, for example, via the tapered roller 23. By the lubricant J thus supplied, resistances between the tapered roller 23 and the inner raceway surface 35, between the tapered roller 23 and the outer raceway surface 34, and between the side surface 37a of the large rib 37 and the large end face 23a of the tapered roller 23, for example, are reduced, whereby heat generation and wear are suppressed.

The rotary device of the present embodiment is a transaxle (see FIG. 1), and when the shaft 19 is rotated by drive of the transaxle (see FIG. 2), the inner ring 22 of the rolling bearing 20 accordingly rotates. This rotation allows part of the lubricant J (see FIG. 3) stored in the lower portion of the rolling bearing 20 to flow out to other regions. When the amount of the lubricant J stored in the lower portion of the rolling bearing 20 decreases, lubrication of the rolling bearing 20 may deteriorate. However, with the rolling bearing 20 of the present embodiment, lubricant J that has flowed out can be returned again to a space (oil reservoir space Q) between the oil reservoir portion 25 and the outer ring 21 in the lower portion of the rolling bearing 20 as described below. Lubricant J stored in this oil reservoir space Q includes lubricant J that was in the surroundings of the gear 26 (see FIG. 2) and has been swirled up by rotation of the gear 26, in addition to the lubricant J that has flowed out from the oil reservoir space Q.

Figure 8:
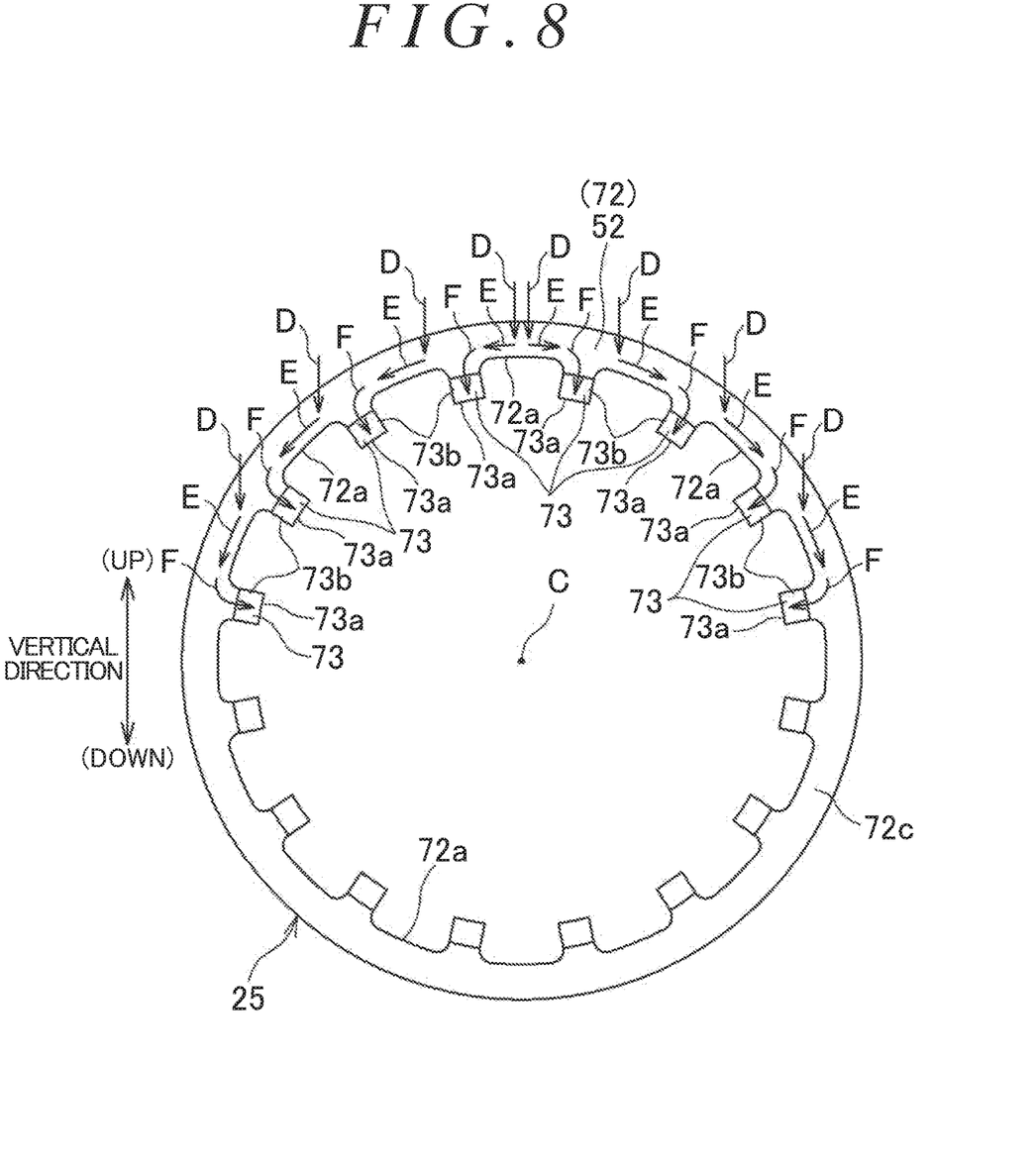
FIG. 8 is a diagram illustrating paths along which lubricant sticking to a side surface of the oil reservoir portion on the other side in the axial direction flows.

FIG. 8 is a diagram illustrating paths along which lubricant sticking to the side surface 72c of the oil reservoir portion 25 on the axially other side flows. The lubricant sticking to the side surface 72c includes lubricant J that was in the surroundings of the gear 26 (see FIG. 2) and has been swirled up by rotation of the gear 26, in addition to the lubricant J that has flowed out from the oil reservoir space Q (see FIG. 3). It is assumed that such lubricant flows downward as indicated by the arrows D, for example, in FIG. 8 and sticks to the side surface 72c. In this case, the lubricant reaches edges of the inner periphery 72a of the annular portion 52 (lip body portion 72).

The following describes a lubricant to be used. The lubricant is designed and prepared so as to have relatively low surface tension thereby being able to easily enter clearances formed between the respective components such as the rolling bearing 20. Thus, as described above, the lubricant having reached edges of the inner periphery 72a of the annular portion 52 (lip body portion 72) is less likely to become oil droplets, and flows along paths indicated by the arrows E in FIG. 8. In other words, the lubricant flows on the annular portion 52 along the circumferential direction.

When the lubricant flowing along the paths indicated by the arrows E has reached protrusions 73 extending downward from the inner periphery 72a of the annular portion 52 (protrusions 73 extending with a downward component), the lubricant flows along paths indicated by the arrows F. In other words, the lubricant flows on the inclined surfaces 73b of the protrusions 73, and reaches the distal ends 73a of the protrusions 73. When having reached the distal ends 73a, the lubricant is collected in an aggregated manner, and thus forms oil droplets. These oil droplets fall onto an outer peripheral surface of the large rib 37 of the inner ring 22 or onto the inner peripheral surface of the cylindrical portion 51 of the oil reservoir portion 25. Particularly in the present embodiment (see FIG. 5), the distal ends 73a of the protrusions 73 are positioned on the axially one side with respect to the side surface 72b of the annular portion 52 on the axially one side. Thus, the lubricant as oil droplets is more likely to fall onto the outer peripheral surface of the large rib 37 or onto the inner peripheral surface of the cylindrical portion 51 of the oil reservoir portion 25. The lubricant having fallen from the protrusions 73 runs along the large rib 37 or the cylindrical portion 51 to move to the oil reservoir space Q between the oil reservoir portion 25 and the outer ring 21 in the lower portion of the rolling bearing 20.

As described above, with the rolling bearing 20 according to the present embodiment, lubricant sticking to the surface (side surface 72c) of the oil reservoir portion 25 on the axially other side can be efficiently collected, and a large amount of lubricant can be continuously kept in the oil reservoir space Q. Consequently, lubrication of the tapered roller bearing 20 can be maintained for a long period of time.

Figure 9:
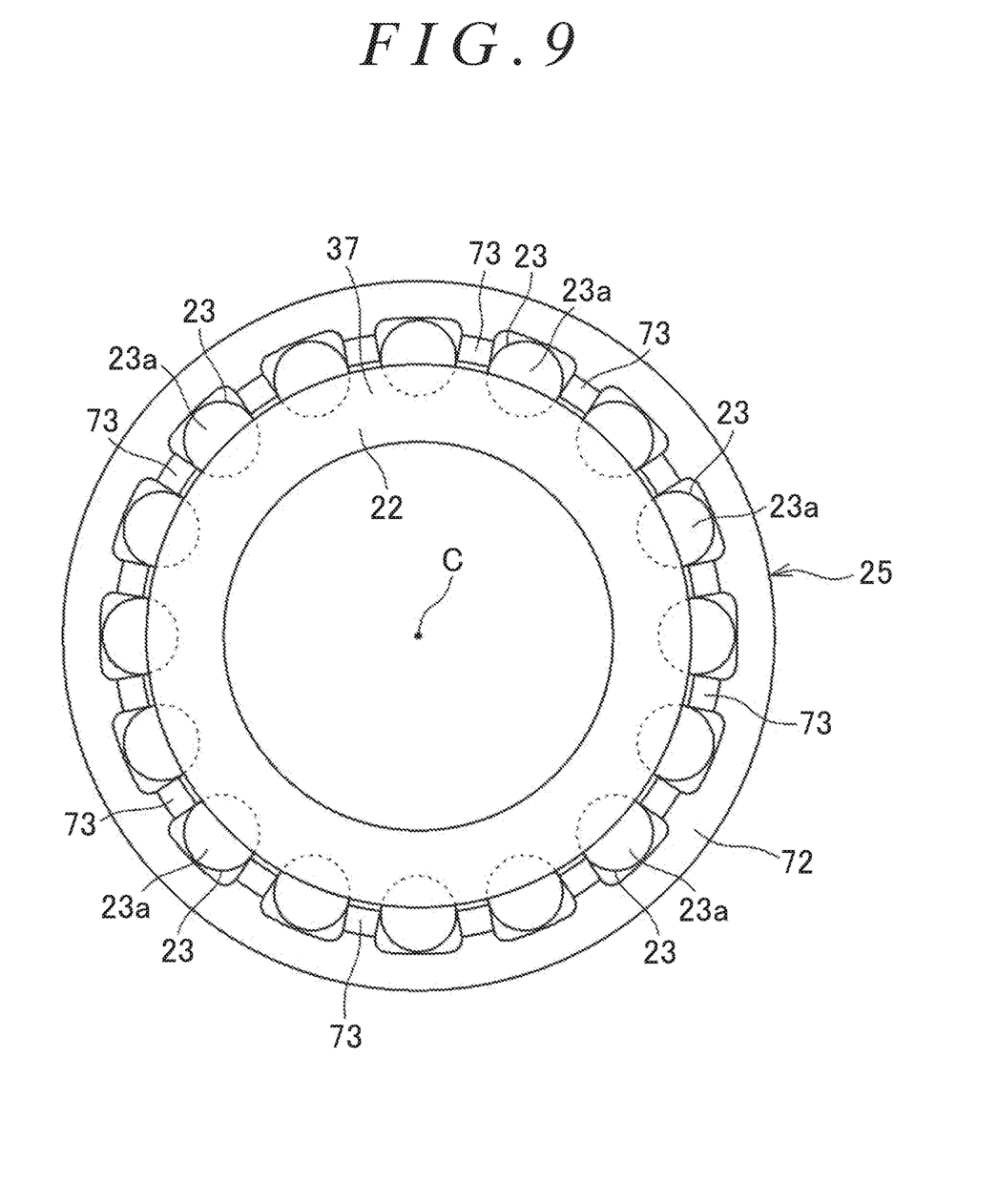
FIG. 9 is a diagram for explaining a positional relation between tapered rollers and protrusions that the oil reservoir portion has, during assembly of the rolling bearing illustrated in FIG. 2.

FIG. 9 is a diagram for explaining a positional relation between the tapered rollers 23 and the protrusions 73 of the oil reservoir portion 25, during assembly of the rolling bearing 20 depicted in FIG. 2. FIG. 9 corresponds to a diagram of the inner ring 22 on which the oil reservoir portion 25 and the tapered rollers 23 are disposed, when viewed from the axially other side. In FIG. 9, the inner ring 22 on which the oil reservoir portion 25 and the tapered rollers 23 are disposed is illustrated, and other members are omitted.

The diameter of the large end face 23a of each tapered roller 23 is substantially the same as or slightly smaller than a circumferential distance between two protrusions 73 that are adjacent to each other in the circumferential direction in the oil reservoir portion 25. The number of the tapered rollers 23 and the number of the protrusions 73 are both 16, and are the same. The number of the tapered rollers 23 and the number of the protrusions 73 are set to be the same, the protrusions 73 are formed at regular intervals in the circumferential direction, and the diameter of each large end face 23a and the circumferential distance between the two protrusions 73 are set as described above. By these settings, during assembly of the rolling bearing 20 described later, each tapered roller 23 can be disposed through between protrusions 73 and 73 that are adjacent to each other in the circumferential direction.

The following describes the assembly of the rolling bearing 20 with reference to FIG. 3. The oil reservoir portion 25 is fixed to an end portion of the outer ring 21 on the axially other side. Separately, a plurality of tapered rollers 23 held by the cage 24 are disposed along the inner raceway surface 35 of the inner ring 22. The inner ring 22 integrated with the tapered rollers 23 and the cage 24 is fitted inside the outer ring 21 to which the oil reservoir portion 25 is fixed. At this time, the inner ring 22 on which the tapered rollers 23 are disposed is inserted from the axially other side of the outer ring 21 to which the oil reservoir portion 25 is fixed. Simultaneously, the protrusions 73 of the oil reservoir portion 25 and the tapered rollers 23 are positionally aligned in the circumferential direction (see FIG. 9). In other words, positional alignment is performed so that each tapered roller 23 can be disposed through between protrusions 73 and 73 adjacent to each other in the circumferential direction. After this positional alignment is performed, the outer ring 21 and the inner ring 22 are brought closer to each other in the axial direction to be assembled. Thus, the assembly of the rolling bearing 20 is completed.

In the embodiment depicted in FIG. 5, the inclined surface 73b provided to each protrusion 73 has a tapered shape the inclination angle of which is constant from the outer peripheral side to the inner peripheral side. However, alternatively, the inclined surface 73b may be formed by two surfaces (not depicted) such that the inclination angle changes at a certain point of the inclined surface 73b. As another modification, the inclined surface 73b may have the shape of a curved line (circular arc) instead of a straight line in its cross-section.

In the embodiment above, a configuration has been described in which the number of the protrusions 73 is the same as the number of the tapered rollers 23 and the protrusions 73 are formed at regular intervals in the circumferential direction, but the present invention is not limited to this. The number of the protrusions 73 may be smaller than the number of the tapered roller 23 and, also in this case, the protrusions 73 are formed at regular intervals in the circumferential direction. When two or more protrusions 73 are formed, the number of the protrusions 73 is preferably set to a divisor of the number of the tapered rollers 23. Even in this case, when the inner ring 22 on which the tapered rollers 23 are disposed is fitted inside the outer ring 21 to which the oil reservoir portion 25 is fixed, each protrusion 73 can be disposed through between two tapered rollers 23 adjacent to each other, and thus assembly can be easily performed.

In the embodiment, a configuration has been described in which the lip body portion 72 of the lip 70 in the oil reservoir portion 25 extends in a direction (radial direction) orthogonal to the axial direction, but the present invention is not limited to this. The lip body portion 72 may be inclined with respect to the central axis C (see FIG. 2). In the embodiment (see FIG. 7), an example has been described in which each protrusion 73 has a rectangular shape when viewed from the axial direction, but the present invention is not limited to this. The shape of the protrusion 73 when viewed from the axial direction is not limited to a particular shape. In the embodiment, an example has been described in which the oil reservoir portion 25 includes the ring 60, but the present invention is not limited to this. The oil reservoir portion 25 does not have to include the ring 60, and in this case, the entire oil reservoir portion 25 is made of elastic material.

Based on the foregoing, the oil reservoir portion 25 is configured as follows. The oil reservoir portion 25 is fixed to an end portion of the outer ring 21 on the axially other side (see FIG. 5). The oil reservoir portion 25 has the cylindrical portion 51, the annular portion 52, and the protrusions 73. The cylindrical portion 51 is formed in a cylindrical shape extending in the axial direction, and is fixed to the end portion of the outer ring 21 on the axially other side. The annular portion 52 is formed in an annular shape extending in the radial direction, and a radially outer end portion of this annular portion 52 is connected to an end portion of the cylindrical portion 51 on the axially other side. The protrusions 73 protrude radially inward from the inner periphery 72a of the annular portion 52 (first configuration). With the first configuration, lubricant sticking to the inner ring 22 (large rib 37) can be caused to flow into a space (oil reservoir space Q) between the outer ring 21 and the oil reservoir portion 25 in a lower portion of the rolling bearing 20. Thus, lubricant stored in the lower portion (oil reservoir space Q) of the rolling bearing 20 can be prevented from decreasing.

In the first configuration, the distal ends 73a of the protrusions 73 are positioned on the axially one side with respect to an end portion (side surface 72c) of the cylindrical portion 51 on the axially other side (second configuration). By this configuration, in upper part of the oil reservoir portion 25, oil droplets of lubricant are formed on the distal ends 73a of the protrusions 73 at positions closer to the inside of the tapered roller bearing 20, and thus become more likely to fall onto the inner ring 22 (large rib 37) and an inner peripheral side of the cylindrical portion 51 of the oil reservoir portion 25. Consequently, the amount of lubricant flowing into the space (oil reservoir space Q) between the outer ring 21 and the oil reservoir portion 25 in the lower portion of the tapered roller bearing 20 can be increased.

In the first configuration or the second configuration, the protrusions 73 are formed on the inner periphery 72a of the annular portion 52. The protrusions 73 are arranged on the inner periphery 72a of the annular portion 52 at regular intervals in the circumferential direction (third configuration). By this configuration, when the rolling bearing 20 is assembled, at least one of the protrusions 73 extends with a downward component from the annular portion 52. Thus, in a state in which the rolling bearing 20 is assembled into the housing 17, regardless of the assembled state, lubricant can be caused to flow from the at least one protrusion 73 into the space (oil reservoir space Q) between the outer ring 21 and the oil reservoir portion 25 in the lower portion of the rolling bearing 20. In the third configuration, the number of the protrusions 73 formed on the inner periphery of the annular portion 52 may be a divisor of the number of the tapered rollers 23 (fourth configuration).

In the third configuration or the fourth configuration, each protrusion 73 has the inclined surface 73b. The inclined surface 73b is formed on the protrusion 73 on its radially inner side, and an end portion thereof on the axially other side is continuous with the side surface 72c of the annular portion 52 on the axially other side. The distance between the inclined surface and the central axis C increases from the axially one side toward the axially other side (fifth configuration). By this configuration, lubricant sticking to the side surface 72c of the oil reservoir portion 25 on the axially other side can be efficiently moved to the distal end 73a of the protrusion 73. Consequently, lubricant outside the tapered roller bearing 20 can be more efficiently collected.

The embodiments disclosed above are merely examples in all respects, and should not be construed as a limitation on the scope of the present invention. Specifically, the rotary device of the present invention is not limited to the illustrated embodiments, and may be implemented in other forms within the scope of the present invention. In the embodiment above, the cage 24 included in the rolling bearing 20 is made of metal, and is produced by pressing, for example. However, the cage 24 may be made of resin, and may be produced with a mold. In FIG. 1, the rotary device 10 has been described as a transaxle. However, the rotary device 10 having the respective configurations described above may be a different type of apparatus, and may be a transmission or a continuously variable transmission, for example. Alternatively, the rotary device may be a rotary device for a facility other than an automobile. In a shaft (e.g., an intermediate shaft) of at least one stage among multi-stage shafts included in such a rotary device, the above-described configurations of the present invention can be used.

According to the present invention, without forming a through hole (lubricant supply hole) for lubrication in the housing and machining for this forming, for example, as in the related art, lubrication of the rolling bearing can be maintained.

What is claimed is:
1. A rotary device comprising:
a housing that accommodates a shaft; and
a rolling bearing including an outer ring that is attached to the housing, an inner ring that rotates integrally with the shaft, a plurality of rolling elements provided between the outer ring and the inner ring, and a cage that holds the rolling elements, wherein a space in the housing on one side of the rolling bearing in an axial direction is a space that is closed except a side close to the rolling bearing, the rolling bearing further includes an oil reservoir portion provided to an end portion of the outer ring in the axial direction and configured to store lubricant between the oil reservoir portion and the outer ring, the oil reservoir portion has a cylindrical portion having a cylindrical shape extending from the outer ring in the axial direction, an annular portion having an annular shape extending radially inward from the cylindrical portion, and a protrusion protruding from an inner periphery of the annular portion, and the protrusion protrudes with a component extending toward a bearing inner side that is a side on which the rolling elements are provided.

2. A rotary device comprising:

a housing that accommodates a shaft; and a rolling bearing including an outer ring that is attached to the housing, an inner ring that rotates integrally with the shaft, a plurality of rolling elements provided between the outer ring and the inner ring, and a cage that holds the rolling elements, wherein in a wall portion of the housing, a through hole communicating with a space on one side of the rolling bearing in an axial direction is formed, and a minimum cross-sectional area of the through hole is smaller than an opening area formed between the outer ring and the inner ring on one side in the axial direction, the rolling bearing further includes an oil reservoir portion provided to an end portion of the outer ring in the axial direction and configured to store lubricant between the oil reservoir portion and the outer ring, and the oil reservoir portion has a cylindrical portion having a cylindrical shape extending from the outer ring in the axial direction, an annular portion having an annular shape extending radially inward from the cylindrical portion, and a protrusion protruding from an inner periphery of the annular portion.

3. The rotary device according to claim 2, wherein the protrusion protrudes with a component extending toward a bearing inner side that is a side on which the rolling elements are provided.

4. A rotary device comprising:

a housing that accommodates a shaft; and a rolling bearing including an outer ring that is attached to the housing, an inner ring that rotates integrally with the shaft, a plurality of rolling elements provided between the outer ring and the inner ring, and a cage that holds the rolling elements, wherein pressure in a first space in the housing on one side of the rolling bearing in an axial direction becomes negative with respect to pressure in a second space on the other side of the rolling bearing in the axial direction due to the pumping action, the rolling bearing further includes an oil reservoir portion provided to an end portion of the outer ring in the axial direction and configured to store lubricant between the oil reservoir portion and the outer ring, the oil reservoir portion has a cylindrical portion having a cylindrical shape extending from the outer ring in the axial direction, an annular portion having an annular shape extending radially inward from the cylindrical portion, and a protrusion protruding from an inner periphery of the annular portion, and the protrusion protrudes with a component extending toward a bearing inner side that is a side on which the rolling elements are provided.

\* \* \* \* \*